United States Patent Office 3,264,059
Patented August 2, 1966

3,264,059
PROCESS FOR THE PREPARATION OF SYNTHETIC FAUJASITE
Carl V. McDaniel, Laurel, and Philip K. Maher, Baltimore, Md., assignors to W. R. Grace & Co., a corporation of Connecticut
No Drawing. Filed Jan. 13, 1964, Ser. No. 337,132
2 Claims. (Cl. 23—113)

This invention relates to an improved process for the preparation of useful microselective adsorbents. In one specific aspect, it relates to an improved process for the preparation of a synthetic crystalline zeolite having an effective pore size of about 13 Angstrom units.

Microselective adsorbents of the zeolite group are crystalline metal alumino-silicates with a three-dimensional structure of silica-alumina tetrahedra. These zeolite structures are characterized by a repeating three-dimensional network of large open alumino-silicate cages inter-connected with small uniform openings or pores. Certain of these microselective adsorbents have been prepared slynthetically from sodium silicate and sodium aluminate. After synthesis these large cavities are filled with water which can be driven off by heating without collapsing the cage. When dehydrated, these cavities can re-adsorb large quantities of water and other vapors at low partial pressures.

Due to the uniform strictures or pore openings connecting the alumino-silicate cavities, these zeolites exhibit the unique property of excluding larger molecules in the cavity and allowing smaller molecules to pass through and be adsorbed thereby acting as microselective adsorbents for molecules according to their size and shape. The adsorbents of the instant invention have an effective pore size of 13 Angstrom units and are also of interest for use in adsorbing large molecules and storing them for later release. These microselective adsorbents will adsorb molecules whose critical size is below about 10–14 Angstrom units. These materials can function as carriers for a wide variety of chemical compounds. When the chemical compound is needed, it is released by heating the carrier or by displacement of the chemical with another adsorbent such as water. In addition, these zeolites also exhibit the property of base exchange whereby one metal cation can be exchanged for another allowing controlled changes in effective pore size.

We have previously disclosed processes for preparing a synthetic crystalline zeolite which is the same material as the naturally occurring zeolite, faujasite.

Faujasite has a continuous range of chemical compositions, thus the material referred to as Z–14 microtrap by us and as type X zeolite by the Linde Division of Union Carbide Corporation has a silica to alumina ratio of 2 to 3. The Z–14 HS zeolite has an X-ray diffraction pattern where the lines have been shifted slightly and the silica to alumina ratio is increased to about 3 to about 5.8.

By using our novel process the tendency toward recrystallization of the faujasite to the Z–7 zeolite or other undesirable species is eliminated. This is accomplished by calcination of the fine sized amorphous silica used in our process at temperatures of from 200 to 1200° F. for periods of 0.1 to 72 hours. The time of calcination is, of course, dependent on the temperature. We have found that calcination at 230° F. for 16 hours and at 1000° F. for 3 hours give satisfactory results. The Z–14 zeolite materials which have a silica to alumina ratio of 2 to 3 are not particularly stable at increased temperatures. Z–14 HS zeolite has a silica to alumina ratio as high as 5.8 and is much more stable. The advantages of the process of this invention are demonstrated in the preparation of the Z–14 HS zeolite. This zeolite is distinguished from the other synthetic faujasites such as type 13 X molecular sieve and Z–14 Na zeolite in that these materials lose their crystallinity on conversion to the hydrogen form. This property (of the Z–14 HS zeolite) of being able to remain as a stable crystalline zeolite in the hydrogen or acid from enhances the patential value of these materials as catalyst components.

Most commercially available fine sized amorphous silicas contain from 4.5 to 11 weight percent water as adsorbed water, hydroxyl water and water of hydration. We have found that a synthetic zeolite which is characterized by the lack of a tendency to recrystallize to an undesirable form can be prepared by a special pre-treatment of the amorphous silica used in the preparation of the synthetic faujasite. This process may be carried out in one or two ways. In the first process, the silica is calcined at 200 to 300° F. This removes the adsorbed water and reduces the water content of the silica to less than 4.5%. The resulting amorphous fine size silica is less reactive, that is, requires more than 16 hours of crystallization time, but the tendency of recrystallization of the resulting faujasite to contaminating products such as zeolite Z–7 is eliminated. When this process is used, it reduces the chance of product contamination and product purity is assured.

In the second process, the silica is calcined at from about 310–1200° F. This calcination removes more of the water and alters the silica structure so that it is more reactive. There is still no tendency for faujasite recrystallization with the resulting product contamination. The water content of this amorphous silica calcined at these temperatures varies from 0.5 to 4.2%.

Thus the essence of our invention resides in the discovery that the synthetic faujasites can be prepared is a very simple, straight-forward process without the danger of contamination from undesirable species, if the silica is calcined using one of the two methods described above. In preparing the Z–14 HS product the calcined silica is then reacted with sodium aluminate using the slurry or the paste process.

In the slurry process the reaction conditions are as follows:

SLURRY PROCESS

| Reaction Conditions | Operable Range | Preferred |
|---|---|---|
| Weight percent of fine-sized silica in the mixture | 6.5 to 26 | 13 |
| Weight percent of Na$_2$O in the mixture | 3.4 to 13.6 | 6.8 |
| Weight percent alumina in the mixture | 0.55 to 2.2 | 1.12 |
| Mole ratio of sodium oxide to SiO$_2$ | 0.25 to 1 | 0.5 |
| Mole ratio of silica to alumina | 10 to 40 | 20 |
| Mole ratio of H$_2$O to Na$_2$O | 20 to 80 | 40 |

The preferred method of preparing the Z–14 HS zeolite is the paste process since this involves the use of smaller quantities of reactants.

In the paste process the silica-alumina-sodium oxide-water mixture is prepared within the mole ratios of sodium oxide to silica of about 0.17 to 0.6, silica to alumina of about 6 to 12, and water to sodium oxide of about 25 to 75.

The silica used in the process of this invention is a reactive particulate form of silica. This silica is commercially available under the trade names Hi Sil, Cabosil, Syloid, etc.

The sodium aluminate used in our process may be any commercial sodium aluminate or it may be conveniently prepared by dissolving alumina trihydrate in a sodium hydroxide solution. Broadly stated, the process of the instant application when used in preparing Z–14 HS comprises the steps of preparing a thoroughly mixed alumina-sodium oxide-water solution within the ratios mentioned above, adding the reactive particulate form of silica which has been calcined as described previously; allowing the resulting paste to equilibrate at 20 to 260° C. for a period of at least 3 hours and heating the digested paste at an elevated temperature (65 to 100° C.). The paste is maintained at the elevated temperatures until the faujasite crystallizes, usually in a period of about 12 to 72 hours at 100° C.

The calcined silica is an important raw material. The type of the silica used in the process should be fine-sized silica having particles between 0.01 and 100 microns, preferably between 0.01 and 10 microns prior to calcination. The operable ranges and preferred conditions on a ratio basis for the paste process is shown in the table below:

| Reaction Conditions | Operable Range | Preferred Range |
| --- | --- | --- |
| Mole ratio of sodium oxide to $SiO_2$ | 0.17 to 0.6 | 0.3 to 0.36 |
| Mole ratio of silica to alumina | 6 to 12 | 8 to 10 |
| Mole ratio of $H_2O$ to $Na_2O$ | 25 to 75 | 40 |

One of the most important ratios and one of the ratios that differentiate the paste process and the slurry process is the silica to alumina ratio. Also in the paste process, the number of moles of water present per mole of alumina is much less than in the slurry process.

The products prepared in the paste and slurry processes have a higher percentage of silica in the structure than the other materials such as the Z–14 zeolite (type X molecular sieves) all of which have essentially the same X-ray diffraction patterns as naturally occurring faujasite, but the position of the Z–14 HS lines are shifted. This shift defines a smaller unit cell for Z–14 HS as compared to Z–14 Na (or 13×) and is due to the fact that silica tetrahedra are slightly smaller than alumina tetrahedra.

If the ratios set out above for the slurry or paste processes are not followed carefully and the essential silica calcination step is not used in preparing the Z–14 HS product, the product will not consistently have the desired adsorption properties of the pure zeolite.

Other factors to be considered in the process of preparing the Z–14 HS product are the aging step and the hydrothermal conversion step. These two factors are closely interrelated to the related variables time and temperature. The aging step is operable at temperatures ranging from 20–60° C. The lowest convenient aging temperature of operation is a temperature of 25° C. The hydrothermal crystallization step follows the aging step. The crystallization step is operable at temperatures from 50–120° C.; the most convenient temperature is 80 to 110° C.

The last step of the process is the crystallization step. While the rate of crystallization of the material is dependent on the temperature used, it is preferred to carry out this step at a temperature near 100° C. At reaction temperatures of 90–110° C. about 16 to 72 hours heating is sufficient; 48 hours is ample in essentially all situations. Since the purpose of the final heating is to effect crystallization of the product, continued heating does not necessarily harm the product but the 16 to 72 hour period represents practical limitations because no further advantage is derived to offset the cost of additional heating. There do not seem to be any side reactions at temperatures below 75° C., but conversion to the Z–14 HS product proceeds very slowly at lower temperatures and, thus, operating at those temperatures is not practical.

The remaining steps of our process present no special difficulty. The crystalline zeolite is removed from the reaction mixture by conventional means such as filtering, decanting, or centrifugation followed by washing with water. The wet zeolite is activated and converted into the adsorbent form by driving off water by heating the zeolite to about 350° C. for about 2 hours. This activation treatment drives off the water contained in the pores of the zeolite and thus gives the zeolite a capacity to readsorb water or other vapors at low partial pressures.

If desired, the wet Z–14 HS zeolite may be converted to the calcium form or the ammonium form. If the zeolite is converted to the ammonium form, it can be converted to the hydrogen form by heating as set out previously. These zeolites may also be converted to any of the other alkali, alkaline earth or rare earth cation forms by treating with an aqueous solution of the appropriate salt using standard base exchange techniques.

The synthetic crystalline faujasite, Z–14 HS, obtained from our improved process has the approximate empirical formula $Na_2O:Al_2O_3:3.2–5.8SiO_2 n H_2O$ where $n$ is a small number, that is, under 9. In order to obtain maximum stability of the hydrogen form, a $SiO_2$ of 5 or greater is desirable. This is important, because as pointed out previously, the higher silica to alumina ratios result in a more stable product.

The gross chemical analysis and the apparent density of the crystal are not a sufficient measure of the true crystal structure characteristic of each microselective adsorbent. The zeolite structures may be distinguished from one another by certain of their physical properties, the most characteristic of which is the X-ray diffraction pattern. After conversion to the Z–14 Na adsorbent or the Z–14 HS adsorbent, for example, the X-ray diffraction pattern of the zeolite is truly the most unique characteristic capable of routine measurement. This follows from the fact that both the unique attributes of the zeolites and their X-ray diffraction patterns are functions of the intimate arrangement of the atoms in the crystal latices. Not only can Z–14 Na zeolite and Z–14 HS zeolite be identified by their X-ray patterns, but the presence of crystalline impurities can be readily distinguished at the same time by the appearance of foreign diffraction lines in the pattern. These crystalline impurities have their own unique patterns and characteristic lines and a usual contaminant such as undesirable zeolites can be readily identified. It can be seen that X-ray diffraction studies provide a powerful tool for evaluating the processes of making synthetic zeolites and, thus, provides a method for systematically determining the effect of changes in the process variables.

The scope and utility of our invention is further illustrated by the following specific but non-limiting examples.

*Example I*

In this example, synthetic faujasite was prepared using a commercially available fine sized silica.

A 219.3 g. portion of this commercial fine sized silica (Hi Sil 233) was dried for 16 hours at 230° F. before use.

A NaOH solution was prepared by dissolving 90.6 grams of NaOH pellets (70.3 grams of $Na_2O$) in 96.5 ml. of water. A total of 52 grams of a commercial alumina trihydrate (34.0 grams of $Al_2O_3$) was added to the NaOH solution which had been previously heated. After the alumina had dissolved the sodium aluminate solution was diluted with 195 ml. of water and cooled to room temperature.

A total of 219.3 grams of commercial fine-sized silica calcined as described above (190.25 grams of $SiO_2$) was mixed with 454.3 grams of water to form a paste. This paste was slowly added to the sodium aluminate solution in a blender and transferred to a resin kettle. The resin kettle was maintained without stirring at 25° C. for 5 days. At the end of this time, the temperature was increased to 100° C. for 48 hours without stirring. Samples were removed after 16, 24 and 48 hours heating to follow the formation of synthetic faujasite.

After 16 hours at 100° C., very little crystallinity had developed and the product had a surface area of 82 m.²/g. After heating for 24 hours at 100° C., a highly crystalline faujasite had been prepared with no contaminating crystalline species. The surface area of the product was 818 m.²/g. The sample removed after 48 hours heating at 100°. C. showed a highly crystalline faujasite with no contaminating crystalline species. The surface area at this point was 962 m.²/g.

This example shows that the desirable synthetic faujasite product can be prepared which does not contain contaminating species if the silica used in preparing the product is calcined at temperature of 230° F. before use.

*Example II*

In this example, the synthetic faujasite was prepared in a manner identical as that described in Example I, except that a total of 219.3 g. of commercially available fine size silica was calcined for 3 hours at 400° F. before use. An additional 22 g. of water was added to the NaOH-alumina trihydrate-silica mixture to compensate for the water lost during calcination of the fine size silica. As in the previous case, the product was examined after 16, 24 and 48 hours' heating.

The sample removed after heating 16 hrs. at 100° C. showed a highly crystalline faujasite with no contaminating crystalline species. The surface area of this product was 1017 m.²/g.

The sample removed after 24 hours' heating at 100° C. showed a highly crystalline faujasite with no contaminating crystalline species. The surface area of this product was 1000 m.²/g.

The sample removed after 48 hours at 100° C. was a highly crystalline faujasite with no contaminating crystalline species. The surface area of the product was 1010 m.²/g.

*Example III*

The synthetic faujasite was prepared in a manner identical to that described in Example I except that 219.3 g. of the commercially available fine sized silica was calcined for 3 hours at 700° F. prior to use. As in Example II, an additional 22 g. of water was added to the aluminate-silica mixture to compensate for the water lost during calcination. As in the previous examples, samples were removed after 16 hours, 24 hours and 48 hours heating at 100° C. The product removed after 16 hours heating at 100° C. showed a highly crystalline faujasite with no contaminating crystalline species had been prepared. The surface area of this material was 1017 m.²/g. The samples removed after 24 and 48 hours at 100° C. showed the same results with no contaminating crystalline species in the product. The surface areas were 998 m.²/g. and 996 m.²/g. respectively.

*Example IV*

In this example, the synthetic faujasite was prepared in a manner identical to that described in Example I except that 219.3 g. of commercially available fine sized silica was calcined at 1000° F. for 3 hours. As in the previous example, an additional 22 g. of water was added to the aluminate-silica mixture to compensate for the water lost during the calcination of the silica. The product was heated at a temperature of 100° C. for a period of 48 hours. The samples were again removed after 16, 24 and 48 hours' heating. In each of these cases, the product was a highly crystalline faujasite with no contaminating crystalline species. The surface area of the product after heating 16 hours at 100° F. was 1030 m.²/g. The sample removed after 24 hours had a surface area of 1070 m.²/g. and the sample removed after 48 hours heating had a surface area of 1020 m.²/g.

*Example V*

This example shows the advantage of using the process of the instant application. In this example, the synthetic faujasite was prepared using the same techniques described in Example I, except that the fine sized silica used in preparing the faujasite was not calcined prior to use.

This example illustrates the problems encountered in the preparation of the synthetic faujasite if the calcination step is omitted.

A solution of sodium aluminate was prepared by heating a mixture of 90.6 g. of NaOH, 52.0 g. of alumina trihydrate and 96.5 g. of water. This solution was cooled to 35° C. and diluted with 195 g. of water which was then added to a paste of 219.3 g. of commercially available fine sized silica as received from the supplier (total volatiles 11%) and 454.5 g. of water. The paste was mixed thoroughly. The mixture was allowed to age for a period of 5 days at 25° C. and then heated at 100° C. for a period of 48 hours. Samples were removed after 16, 24 and 48 hours' heating and the product examined.

The sample removed after 16 hours' heating showed a highly crystalline faujasite with no contaminating crystalline species. The product had a surface area of 997 m.²/g.

The sample removed after 24 hours heating at 100° C. showed less crystalline faujasite and a significant quantity of the contaminating crystalline species zeolite Z–7. The surface area of this product was 864 m.²/g.

The product recovered after 48 hours' heating showed that most of the faujasite had recrystallized to the Z–7 zeolite. The surface area of this product was only 150 m.²/g.

It is obvious from a comparison of the data presented here with the data presented in Examples I, II, III and IV that the process of the instant application requires very careful control of processing conditions of the commercially available fine sized silica used in preparing these materials not calcined prior to use. The calcination of the fine sized silica removes any tendency of the Z–14 HS product to recrystallize to the undesirable zeolitic species. Thus, our improved process eliminates one of the major problems in the preparation of the pure Z–14 HS product.

*Example VI*

This example illustrates the preparation of the Z–14 HS product on a larger scale by our novel process. In this run, a solution of sodium aluminate was prepared using 11,470 g. of sodium hydroxide and 6,583 g. of alumina trihydrate. The solution was added to a slurry of 27,763 g. of commercially available fine sized silica which had been calcined for 16 hours at 400° F. prior to use. The silica had been mixed with 233 g. of water. The mixture, which contained a total of 96,660 g. of water, was aged for 2 days at room temperature and then heated to 100° C. for 21 hours. Examination by powder X-ray techniques showed the product to be a well crystallized faujasite with no contaminating crystalline species. The product had the following analysis:

| | |
|---|---|
| $Al_2O_3$ (dry basis), wt. percent | 21.99 |
| $SiO_2$ (dry basis), wt. percent | 63.62 |
| $Na_2O$ (dry basis), wt. percent | 14.25 |
| Unit cell size, A | 24.64 |
| Surface area @700° F., m.²/g. | 877 |

In this example, as in the previous examples, the surface area was determined by a modification of the well known Brunauer, Emmett, Teller method described in the article by S. Brunauer, P. Emmett and E. Teller, J. Am. Chem. Soc., 16, 309 (1938).

Obviously, many modifications and variations of the invention as herein set forth may be made without departing from the essence or scope thereof and only such limitations should be applied as are indicated in the appended claims.

What is claimed is:
1. A process for preparing synthetic faujasite having the approximate gross composition $Na_2O:Al_2O_3:3.2$ to $5.8\ SiO_2:nH_2O$ wherein $n$ has a value less than 9 having an effective pore size of about 13 Angstrom units, and capable of being converted to the hydrogen form without collapse of the crystal structure wherein an amorphous fine-sized silica containing from 4.5 to 11 weight percent water is one of the principal reactants, which consists essentially of:

(a) dehydrating and activating said silica by calcining the silica at a temperature of 310 to 1100° F. for a period of 0.1 to 72 hours, wherein the water content is reduced to 0.5 to 4.2%,
(b) preparing a solution of sodium hydroxide,
(c) dissolving alumina in said solution,
(d) preparing a sodium hydroxide-alumina-calcined silica slurry by rapidly mixing a slurry of the calcined fine sized silica with the solution of sodium hydroxide and alumina,
(e) aging said slurry at a temperature of 20 to 60° C. for about 3 to 300 hours,
(f) heating the aged mass at a temperature of 75 to 100° C. for 3 to 72 hours, the mole ratio of reactants being:
0.17 to 0.60 mole of sodium oxide per mole of silica,
6 to 12 moles of silica per mole of alumina, 25 to 75 moles of water per mole of sodium oxide.

2. A process for preparing synthetic faujasite having the approximate gross composition $Na_2O:Al_2O_3:3.2$ to $5.8\ SiO_2:nH_2O$ wherein $n$ has a value less than 9 having an effective pore size of about 13 Angstrom units, and capable of being converted to the hydrogen form without collapse of the crystal structure wherein an amorphous fine-sized silica containing from 4.5 to 11 weight percent water is one of the principal reactants, which consists essentially of:

(a) dehydrating and activating said silica by calcining the silica at a temperature of 310 to 1100° F. for a period of 0.1 to 72 hours, wherein the water content is reduced to 0.5 to 4.2%,
(b) preparing a solution of sodium hydroxide,
(c) dissolving alumina in said solution,
(d) preparing a sodium hydroxide-alumina-calcined silica slurry by rapidly mixing a slurry of the calcined fine sized silica with the solution of sodium hydroxide and alumina,
(e) aging said slurry at a temperature of 20 to 60° C. for about 3 to 300 hours,
(f) heating the aged mass at a temperature of 75 to 100° C. for 3 to 72 hours, the mole ratio of reactants being:
0.3 to 0.36 mole of sodium oxide per mole of silica,
8 to 10 moles of silica per mole of alumina, about 40 moles of water per mole of sodium oxide.

References Cited by the Examiner

UNITED STATES PATENTS

| | | | |
|---|---|---|---|
| 3,059,997 | 10/1962 | Schwartz | 23—182 |
| 3,081,154 | 3/1963 | Acker et al. | 23—182 |
| 3,130,007 | 4/1964 | Breck | 23—113 |

OSCAR R. VERTIZ, *Primary Examiner.*

BENJAMIN HENKIN, *Examiner.*

E. J. MEROS, *Assistant Examiner.*